United States Patent [19]

Plee et al.

[11] Patent Number: 5,670,568
[45] Date of Patent: Sep. 23, 1997

[54] COMPOSITIONS OF MIXED ALUMINUM ALKALINE-EARTH METAL HYDROXIDE TYPE AS ANTICHLORINE AND ANTIACID AGENTS FOR THE STABILIZATION OF THERMOPLASTIC RESINS

[75] Inventors: Dominique Plee, Bizanos; Ludovic Hardouin DuParc, Nevers, both of France

[73] Assignee: Elf Atochem S.A., Paris-La-Defense, France

[21] Appl. No.: 504,386

[22] Filed: Jul. 19, 1995

[30] Foreign Application Priority Data

Jul. 21, 1994 [FR] France .................................. 94 09025

[51] Int. Cl.$^6$ .................................................. C08K 3/22
[52] U.S. Cl. ............................................ 524/436; 423/600
[58] Field of Search ........................... 524/436, 437; 423/600; 424/690, 691, 68

[56] References Cited

U.S. PATENT DOCUMENTS

| | | | |
|---|---|---|---|
| 2,075,251 | 3/1937 | Winkelmann | 524/567 |
| 2,365,400 | 12/1944 | Fikentscher | 524/436 |
| 2,636,830 | 4/1953 | Wall | 106/306 |
| 2,952,659 | 9/1960 | Pfeifer | 524/437 |
| 3,620,995 | 11/1971 | King | 524/436 |
| 3,661,813 | 5/1972 | Cronin | 524/437 |
| 3,912,671 | 10/1975 | Kondo et al. | 524/436 |
| 4,299,759 | 11/1981 | Miyata et al. . | |
| 4,392,979 | 7/1983 | Lee et al. . | |
| 4,427,816 | 1/1984 | Aoki et al. . | |
| 4,511,710 | 4/1985 | Wang et al. | 528/485 |
| 4,610,797 | 9/1986 | Kar | 252/35 |
| 4,797,425 | 1/1989 | Razvan et al. . | |
| 4,910,246 | 3/1990 | Burba et al. | 524/399 |
| 5,241,094 | 8/1993 | Razvan et al. . | |
| 5,280,083 | 1/1994 | Forste et al. | 524/436 |
| 5,298,545 | 3/1994 | Razvan et al. . | |
| 5,312,859 | 5/1994 | Preston et al. | 524/436 |

FOREIGN PATENT DOCUMENTS

| | | |
|---|---|---|
| 2403362 | 5/1979 | France . |
| 1219223 | 6/1966 | Germany . |
| 153967 | 2/1982 | Germany . |
| 63-233010 | 9/1988 | Japan . |
| 1-270509 | 10/1989 | Japan . |
| 3-19317 | 8/1991 | Japan . |
| 4240114 | 8/1992 | Japan . |
| 1415929 | 12/1975 | United Kingdom . |
| WO92/13914 | 8/1992 | WIPO . |

OTHER PUBLICATIONS

"Study of the Mechanism of Thermal Degradation of Polyivinyl Chloride)" *Polymer Degradation and Stability*, 24:2 127–35 (1989).

*Primary Examiner*—Veronica P. Hoke
*Attorney, Agent, or Firm*—Pennie & Edmonds LLP

[57] ABSTRACT

This invention relates to compositions resulting from the reaction, in aqueous phase, of aluminum hydroxide, of alkali metal cation hydroxide and of calcium or strontium hydroxide. The addition of such a composition to PVC resins or to olefinic resins from Ziegler catalysis prevents the degradation of these resins under the effect of light or of heat, in particular during extrusion.

11 Claims, No Drawings

COMPOSITIONS OF MIXED ALUMINUM ALKALINE-EARTH METAL HYDROXIDE TYPE AS ANTICHLORINE AND ANTIACID AGENTS FOR THE STABILIZATION OF THERMOPLASTIC RESINS

BACKGROUND OF THE INVENTION

1.1 Field of the Invention

The invention relates to the use of compositions of mixed aluminum alkaline-earth metal hydroxide types as agents for removing chlorine or acidic products in thermoplastic resins which contain them or which are liable to generate them upon exposure to heat or light.

1.2 Description of the Related Art

The resins referred to in particular include PVC in commonplace applications such as films, sheets or sections employed in building or other commonplace applications of PVC, and the polyolefins obtained by catalysis of Ziegler type. In these resins the chlorine residues or acidic traces originating from the catalysts can cause two types of effects: 1) corrosion of the metal components and parts of the processing molds and machines, and 2) degradation of the resin due to the effect of UV radiation and heat, in particular when it is converted by extrusion. What is known about the mechanisms by which PVC and other halogenated resins degrade as a result of heat is that they undergo a dehydrochlorination catalyzed by the hydrochloric acid released, resulting in the formation of double bonds and, consequently, of coloring. Since there are many double bonds, crosslinking, either between polymer chains or within a chain also occurs (see Polymer Degradation and Stability, vol. 24, No. 2, 1989, p. 127–135). In addition, the effect of oxygen on the change in the properties of PVC is attributed to the formation of free radicals whose effect is combined with that of the dehydrochlorination.

The aging of resins containing halogen compounds can be slowed down by neutralizing the HCl in step with its appearance. Various combinations of organic and inorganic products have been used: thus U.S. Pat. No. 4,797,426 claims the use of basic lead phosphites. Other lead-based compositions are mentioned in DE 12,19223 (Pb phthalate) and in DE 24 19379 (Pb fumarate). These compounds, as well as others based on heavy metals (cadmium, barium), are being questioned again because of their toxicity.

Research to find substitutes for these formulations has revealed that organic salts such as Ca and Zn stearates have advantageous stabilization properties but exhibit the shortcoming of offering the resin only an insufficient long-term behavior. Also, the initial color of the PVC article has not been as good as with formulations based on heavy metals.

French Application FR-A-2,403,362 proposes a solution for improvement in which, in order to manufacture flexible PVC intended for cable insulation, a mixture of fatty acid salts of calcium and of zinc, used in combination with a beta-diketone is employed as stabilizer. The idea of combining these fatty acid salts with a costabilizer is also disclosed in Japanese Patent JP 1,213,865, in which the costabilizer is a hydrotalcite. Finally, the idea of associating a hydrotalcite with a beta-diketone is described in U.S. Pat. No. 4,427,816. The idea of employing hydrotalcite as costabilizer for PVC in association with zinc stearate is indicated in Kyowa Japanese Application No. 80 80445 with the additional detail that the hydrotalcite must have a specific surface area, measured using the BET technique, lower than 30 m$^2$/g.

Other inorganic materials have also been tried as costabilizers for PVC formulations. Thus, for instance French Application No. 88 02880 of M&T Chemicals Inc. claims stabilizing mixtures including a hydrotalcite, a zinc zeolite and a zinc carboxylate.

More recently, international applications of the Bariocher company, No. W09111421, W09108984 and W09213914 respectively, deal with various products usable as costabilizers in PVC formulations, based on zinc and calcium stearates. For convenience in the description, they have been regrouped under a general formula of the type

$$Ca_xAl(OH)_{2x+(3-2y)} \cdot yA \cdot mH_2O$$

where x=1 to 4, y=0 or 0.5 and m=0 to 8, where A denotes either the HPO$_3$ anion or an anion derived from an aliphatic, aromatic or heteroaromatic dicarboxylic acid. The information provided by X-ray diffraction on the crystal structure is incomplete. What is known is that they are mainly neither mixtures of portlandite and gibbsite nor hydrotalcites, and that the compounds according to W09213914, products corresponding to y=0, are of hydrocalumite type.

SUMMARY OF THE INVENTION

The products according to the present invention are hydroxide compositions which result from a process in which aluminum hydroxide, an alkali metal cation hydroxide and a hydroxide of an element selected from the group consisting of calcium or strontium are mixed in aqueous phase. The mixture is heated to a desired temperature which may be between the ambient and about 100° C. for a desired period of about a few minutes to a few days. The process can be continued by a filtration, a washing of the compound formed and a drying at a temperature which is lower than 200° C. These products exhibit an astonishing peculiarity: X-ray diffraction is incapable of distinguishing their structure from that of the starting hydroxides, in particular in the case of compositions based on calcium/aluminum hydroxide and from that of portlandite and of gibbsite (see Table I). This finding is in contradiction with the fact that the stabilizing properties of the products of the invention and of their initial components are very different, as the examples below show.

DETAILED DESCRIPTION OF THE PREFERRED EMBODIMENTS

The molar ratio of the divalent, calcium or strontium hydroxide to the aluminum is a fairly significant parameter, which should be limited between about 2 and 10 and preferably between about 3 and 8.

Examples of thermoplastic resins which are stabilizable in accordance with the invention include resins which contain halogens or which include compounds of a nature originating from the catalysts employed, such as sulfuric acid, boron trifluoride, titanium tetrachloride, aluminum chloride and tin tetrachloride. The thermoplastic resins can include vinyl chloride polymers or copolymers, vinylidene chloride polymers or copolymers, fluorinated or chlorinated rubbers such as chlorinated PVC, chlorinated waxes, dielectric fluids and vinyl acetate polymers or copolymers such as polyvinyl acetate or the copolymer of ethylene and of vinyl acetate. For the same reason the invention applies to olefinic resins containing halogens originating from the polymerization catalysts or from posthalogenation. Thus, appropriate resins include alpha-olefin homopolymers and copolymers, the copolymers of at least one olefin and of a diene, postchlorinated products of these polymers and copolymers and mixtures of olefinic resins containing halogens, which include polyethylene, polypropylene, poly-1-butene, Poly-1-methylpentene and ethylene/propylene copolymers which are obtained by employing Ziegler-type catalysts.

The stabilization or costabilization of these resins is obtained by mixing them with the hydroxide compositions according to the invention, in the case of PVC and similar resins, in a proportion of 0.1 to 2% by weight of resin, preferably 0.2 to 1.5%, in a fast mixer and, in the case of the olefinic resins, in a proportion of 10 to 100,000 ppm, preferably 100 to 10,000 ppm, in a Buss kneader.

The antichlorine and antiacid agents according to the invention offer advantages which are not insignificant over the products of the prior art. In particular, they are naturally compatible with resins with which they form homogeneous mixtures without there being any need for this purpose of subjecting them to any treatment for imparting water repellency. This advantage is not easily observed in a laboratory, but is appreciated on the scale of industrial extruders. Furthermore, they are prepared at very moderate temperatures, or even at ambient temperature, and at atmospheric pressure, by a process which is therefore very economical.

The invention will be understood better from the reading of the tests by means of which the stability of the resins is assessed, and of the examples which are now given. The following examples are provided as illustrations, not limitations on the invention.

with the Congo Red test (a static test in which a sample of PVC is heated and the release of HCl released is monitored in the presence of a colored indicator consisting of Congo Red).

The formulation tested is the following:

| Ingredient | Name | Quantity | Function |
|---|---|---|---|
| PVC | Lacovyl S110P | 100 | Resin |
| CaCO₃ | Hydrocarb 95T | 5 | Filler |
| TiO₂ | Kronos 2220 | 4 | Pigment and anti-UV |
| MMA/Bd/BuA* | Durastrength 200 | 6 | Impact additive |
| PE wax | Vestowax SH105 | 0.25 | External lubricant |
| Phthalate | Loxiol G60 | 0.2 | Internal lubricant |
| Oxidized PE wax | Acrawax 629 | 0.15 | External lubricant |
| Subst. phenol | Irganox 1076 | 0.2 | Antioxidant |
| Zn stearate | Stavinor ZNE | 1 | Color stabil. |
| Ca laurate | Stavinor Ca794 | 1 | Long-term stabil. |

*Butadiene/methyl methacrylate copolymer on butadiene/butyl acrylate core.

A master mixture to which are added the anti-chlorine and antiacid agents which it is to be evaluated is prepared in a Papenmeier type powder mixer. The precise mixing conditions are the following:
rise to 110° C. at 3500 revolutions per minute;
descent to 40° C. at 1600 revolutions per minute;
rest for 24 hours at ambient temperature.

EXAMPLE 1

A synthesis is performed for which 3 moles or 222 grams of calcium hydroxide, 1 mole or 40 grams of sodium

TABLE I

RADIOCYRSTALLOGRAPHIC CHARACTERISTICS OF ANTICHLORINE/ANTIACID PRODUCTS

The x-ray defraction lines for each product are shown in tenths of nanometers (angstroms), with their intensity expressed as S = strong, m = medium, w = weak

| Product according to WO9108984, ex. 2 | | Portlandite | | Gibbsite | | Product according to the invention ex. 1 | | Hydrotalcite | | Hydrofcalumite | | Ca aluminate | | Calcite | |
|---|---|---|---|---|---|---|---|---|---|---|---|---|---|---|---|
| 11.03 | m | 4.91 | s | 4.86 | s | 4.822 | s | 7.69 | 2s | 7.81 | s | 7.81 | s | 3.02 | s |
| 7.25 | s | 4.35 | s | 4.33 | s | 4.34 | s | 3.844 | s | 3.9 | m | 4.86 | w | 2.28 | s |
| 5.53 | s | 3.36 | s | 3.33 | s | | | 2.59 | s | 3.79 | m | 3.911 | m | 1.92 | s |
| 4.91 | s | 3.32 | m | 3.21 | m | | | 2.34 | m | 2.87 | s | 3.79 | m | | |
| 4.37 | w | 3.11 | m | 3.11 | m | 3.10 | m | | | 2.31 | m | 3.40 | w | | |
| | | | | | | 2.62 | m | | | | | 2.87 | s | | |
| | | | | | | | | | | | | 2.69 | m | | |

EXAMPLES

The evaluation of the antichlorine and antiacid agents described in the invention was performed by starting with rigid PVC formulations on the roll mill of Lescuyer ML110 type at a temperature of 190° C., with a roll speed of 20 and 24 revolutions per minute and a gap of 0.6 nm. The stability time is evaluated, that is to say the time after which a crosslinking of the PVC contained in the test film takes place, which is assessed by the release of the film, which no longer adheres to the mill roll. The change in the color of the polymer can also be followed during the test. More particular interest is paid to the antichlorine and antiacid agents for which the stability time reaches or exceeds 30 minutes. This test is generally fairly well correlated:
with the test carried out by means of the Brabender mixer (a dynamic test in which PVC is heated in an internal mixer and in which the change in its rheology is followed by monitoring the torque needed to turn the blades of the mixer; this is an assessment of the crosslinking of PVC);

hydroxide, and 1 mole of alumina trihydrate are mixed in 2 liters of water. Calcium hydroxide and alumina grades with an Fe₂O₃ content lower than 100 ppm and a particle size smaller than 80 μm is preferred. The mixture is heated with gentle stirring to 90° C. over approximately 1 hour and is maintained at the temperature under consideration for 5 hours; it is then filtered and washed with 8 liters of water. After drying at 50° C., the product is grounded, screened to less than 63 microns and added to the formulation described above in a proportion of 1% relative to the PVC resin.

The stability time determined according to the mill roll test is 35 minutes. Under the same conditions, the stability time without addition of the antichlorine and antiacids product is 20 minutes.

EXAMPLE 2

By way of comparison with the products described in Application WO9108984, the syntheses of these compounds according to Examples 1, 2 and 3 were carried out so as to obtain the phases: $Ca_3Al_2(OH)_{10}\cdot HPO_3$, $Ca_4Al_2(OH)_{12}\cdot HPO_3$ and $Ca_6Al_2(OH)_{16}\cdot HPO_3$. The evaluation of these products under the above-mentioned conditions gave stability times of 23, 25 and 29 minutes respectively. The superiority of the compounds according to the invention is thus demonstrated.

Another evaluation was made of products according to Patent W09213914, which were obtained as follows. 0.2 moles of $CaCl_2$ are reacted with 0.1 mole of $AlCl3$ in 250 ml of water, and approximately 40 ml of 50% sodium hydroxide are added with energetic stirring (which corresponds to a pH of approximately 10). The mixture is heated to 90° C. and after two hours' reaction, it is filtered and washed with a liter of water, and the product thus obtained was then dried and grounded. X-ray diffraction shows that the product is a crystallized hydrocalumite. The incorporation of this product into the stabilizing formulation described above does not make it possible to exceed a stability time of 19 minutes. Hence in the test formulation the compounds corresponding the products cited by the above-mentioned patents produce only a weak improvement, or even none.

EXAMPLE 3

A synthesis similar to that described in Example 1 is carried out, but the calcium hydroxide is replaced with 3 moles or 365 grams of strontium hydroxide and the reaction is conducted at 50° C. A stability time of 41 minutes is measured, which represents a significant gain in comparison with the costabilizer of Example 1.

EXAMPLE 4

In this example the synthesis is performed under the conditions of Example 1, but the work is done at 50° C. in order to perform the reaction, instead of 90° C. The stability time measured is 32 minutes.

EXAMPLE 5

This example is intended to illustrate what happens when the ratio of the alkaline-earth cation to the aluminum is lowered from 3, as in the preceding examples, to 1. In the case of the syntheses performed with calcium and strontium hydroxides the stability times are 19 and 21 minutes respectively. These results demonstrate that the ratio of alkaline-earth cation/aluminum ratio is fairly significant.

EXAMPLE 6

A synthesis of antichlorine and antiacid agent is performed by adding 3 moles or 492 grams of calcium nitrate, to 1 liter of water and by dispersing therein, with energetic stirring by means of a shearing turbine, 1 liter of a solution of sodium aluminate obtained by dissolving, one mole of alumina hydrate (78 grams) in 3 moles of sodium hydroxide (120 grams) at 110° C.–120° C. The mixture thus prepared is heated to 90° C. for approximately an hour, maintained at this temperature for 5 hours, and then filtered and washed with 8 liters of water. After drying at 50° C., grinding and screening to less than 63 microns, the resulting additive is incorporated into the formulation described above, for which a stability time of 28 minutes is measured. This demonstrates that not all the reactants based on calcium and/or aluminum produce the same results and that, in particular, those which correspond to the best conditions of formation of calcium aluminate should be rejected.

EXAMPLE 7

This example is used to illustrate what happens when only the source of aluminum is changed, in comparison with Example 1. The same synthesis is carried out by replacing the mole of alumina hydrate and the mole of sodium hydroxide with 1 liter of sodium aluminate solution obtained by dissolving while hot, 1 mole of alumina hydrate in 1 liter of 3-molar sodium hydroxide solution. The remainder of the operation is unchanged insofar as the reaction temperature and period, the quantities of water for washing and the drying, grinding and screening conditions are concerned.

After incorporation into the formula described above at a level of 1% relative to the resin, an insufficient stability time of 26 minutes is measured; which leads to the conclusion like the one in Example 6.

EXAMPLE 8

This example is used to verify that the conclusion drawn from Example 6 is also valid for the element strontium. The 3 moles of calcium nitrate of Example 6 are therefore simply replaced with 3 moles of strontium nitrate. The remainder of the operation is unchanged and, after incorporation of the antichlorine and antiacid agent at a level of 1% relative to the resin, a stability time of 20 minutes is measured.

Examples 6, 7 and 8 therefore clearly demonstrate that the source of the reactants greatly influences the stability time result and that the best sources in this respect are the hydroxides of calcium (or strontium) and of aluminum.

EXAMPLE 9

A synthesis of antichlorine and antiacid agent according to the invention is performed by mixing, in 1 liter of water, 3 moles or 174 grams of magnesium hydroxide, 1 mole of sodium hydroxide and 1 mole of alumina trihydrate. The mixture thus obtained is heated to 90° C. over approximately 1 hour and is maintained at this temperature for 5 hours with gentle stirring. The product is filtered off and washed with liters of water and then dried at 50° C.

An insufficient stability time of 24 minutes is measured on the product resulting from this operation, incorporated at a level of 1% in the formula described above, which results in magnesium hydroxide being rejected as reactant for obtaining protective agents according to the invention.

EXAMPLE 10

The operation described in Example 9 is repeated but with magnesium hydroxide replaced by barium hydroxide in the same molar ratio. The insufficient measured stability time at 22 minutes, which results in barium hydroxide being rejected as reactant for obtaining protection agents according to the invention.

EXAMPLE 11 (counterexample)

A synthesis is carried out under the conditions of Example 1, but with the reaction mixture being heated to 140° C. for 5 hours. The remainder of the operation is unchanged and the stability time measured after incorporation of the stabilization agent thus produced in the formulation described above is 29 minutes.

EXAMPLE 12 (counterexample)

The operation described in Example 11 is repeated, calcium hydroxide being replaced with strontium hydroxide and with the synthesis being performed at 120° C. The measured stability time is 25 minutes, which confirms the observation drawn from Example 11, that the synthesis preferably is conducted at temperatures between the ambient and about 100° C.

EXAMPLE 13

A synthesis is performed as in Example 1, but raising the ratio of calcium to aluminum to 6. The stability time is 37 minutes. The same operation is carried out starting with strontium hydroxide and the stability time of 42 minutes is obtained.

EXAMPLE 14

By way of comparison, calcium, aluminum and strontium hydroxides are tested for their stabilizing properties in the formulations described above. Stability times of 30 minutes, 19 minutes and 33 minutes respectively are found. These results show that the process described in Example 1 and in Example 13, among others, yields products whose costabilizing properties are superior to those of each of the constituents which form part thereof.

EXAMPLE 15

A reaction is performed by mixing 3 moles of calcium hydroxide and 1 mole of sodium hydroxide in 2 liters of water. After 5 hours at 90° C., drying, and screening to 63 microns, the product is tested as costabilizer in the formula described above. A stability time of 33 minutes is measured. This shows that it is not only the bringing of calcium hydroxide into contact in an NaOH basic medium that produces the optimum stabilization.

EXAMPLE 16

A synthesis is performed as in Example 3, but raising the Sr/Al ratio from 3 to 8. The measured stability time is 40 minutes.

EXAMPLE 17

A synthesis is performed as in Example 1, but raising the Ca/Al ratio from 3 to 8. The corresponding stability time is 34 minutes.

EXAMPLE 18 (counterexample)

A synthesis is performed by mixing, in 100 ml of water, 0.15 mole of $ZnCl_2$, 0.05 mole of $Al(OH)_3$ and 0.35 mole of NaOH, and by heating this mixture to 90° C. with stirring for 5 hours. The filtration and the washings are very long and the resulting product does not enable stability times greater than 22 minutes to be obtained, once incorporated in the above stabilizing formulation.

EXAMPLE 19 (counterexample)

The synthesis is carried out as in Example 18, with the difference that $ZnCl_2$ is replaced with an equi-molar quantity of $SnO_2$. The stability time is 22 minutes.

EXAMPLE 20

Various dosages of the product of Example 13 are produced in the stabilizing formulation, which is used in experiments at constant quantity relative to the resin. The following are measured:
at 0.5 % a stability time of 35 minutes,
at 1% a stability time of 37 minutes,
at 2% a stability time of 27 minutes.

While it is apparent that the invention disclosed herein is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

We claim:

1. A composition for the reduction of chlorine or acidic products in polymeric materials comprising the solid product of a reaction between an aluminum hydroxide and a divalent metal hydroxide selected from the group consisting of calcium hydroxide and strontium hydroxide, wherein the reaction occurs in an aqueous phase and in the presence of a sufficient amount of a hydroxide of an alkali metal to maintain the pH of the aqueous phase at about 13, and wherein the aluminum hydroxide and the divalent metal hydroxide are reacted at a temperature between about 50° C. and about 90° C., and wherein the molar ratio of the divalent metal to the aluminum is between about 2 and 10.

2. The composition of claim 1 wherein the solid product is filtered and washed with water before the product is dried at a temperature below 200° C.

3. The composition of claim 1 wherein the molar ratio of the divalent metal to the aluminum is between about 3 and 8.

4. A thermoplastic resin containing a halogen comprising a composition for the reduction of chlorine or acidic products in the resin comprising the solid product of a reaction between an aluminum hydroxide and a divalent metal hydroxide selected from the group consisting of calcium hydroxide and strontium hydroxide, wherein the reaction occurs in an aqueous phase and in the presence of a sufficient amount of a hydroxide of an alkali metal to maintain the pH of the aqueous phase at about 13, and wherein the aluminum hydroxide and the divalent metal hydroxide are reacted at a temperature between about 50° C. and about 90° C., and wherein the molar ratio of the divalent metal to the aluminum is between about 2 and 10.

5. The resin of claim 4 wherein the composition is in an mount of about 0.1 to 2 weight percent of the resin.

6. The resin of claim 4 wherein the composition is in an mount of about 0.2 to 1.5 weight percent of the resin.

7. A process for stabilizing thermoplastic resins containing halogens against degradation due to light or heat comprising the incorporating of the composition of claim 1.

8. An olefinic thermoplastic resin containing acidic compounds comprising a composition for the reduction of chlorine or acidic products in the resin comprising the solid product of a reaction between an aluminum hydroxide and a divalent metal hydroxide selected from the group consisting of calcium hydroxide and strontium hydroxide, wherein the reaction occurs in an aqueous phase and in the presence of a sufficient amount of a hydroxide of an alkali metal to maintain the pH of the aqueous phase at about 13, and wherein the aluminum hydroxide and the divalent metal hydroxide are reacted at a temperature between about 50° C. and about 90° C., and wherein the molar ratio of the divalent metal to the aluminum is between about 2 and 10.

9. The olefinic thermoplastic resin of claim 8 wherein the composition is in an mount of about 10 to 10,000 ppm.

10. The olefinic thermoplastic resin of claim 9 wherein the composition is in an mount of about 100 to 10,000 ppm.

11. A process for stabilizing olefinic thermoplastic resins containing acidic compounds against degradation due to light or heat comprising the incorporating of the, composition of claim 1.

* * * * *